June 26, 1951    F. O. PETERSON    2,558,153
ONE WHEEL COLLAPSIBLE TRAILER
Filed April 7, 1948    3 Sheets-Sheet 2
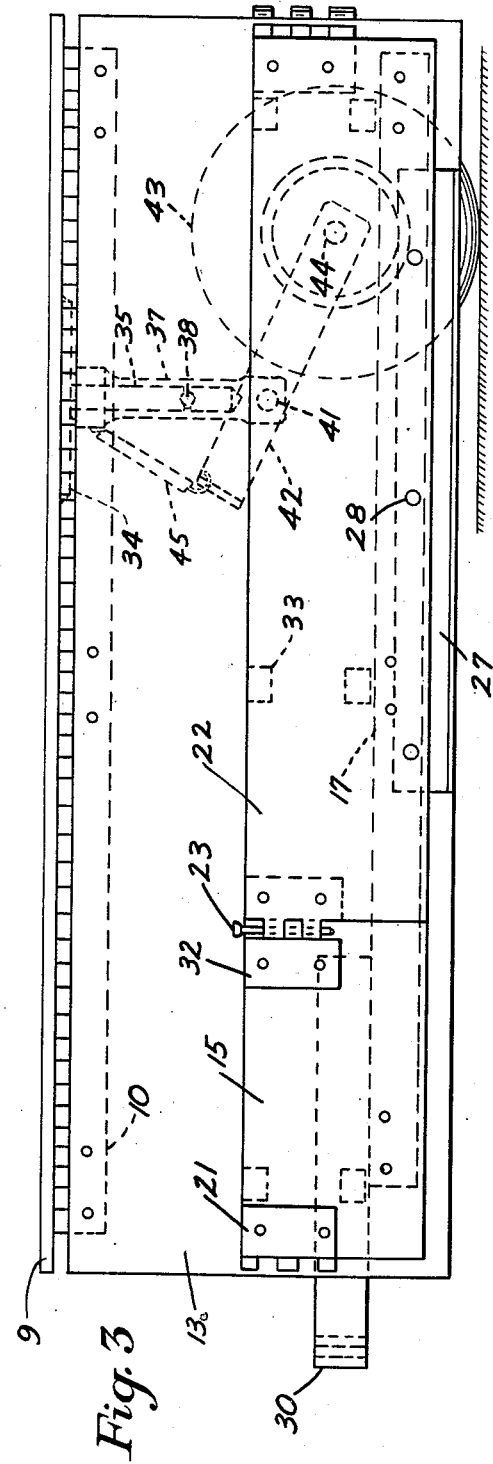
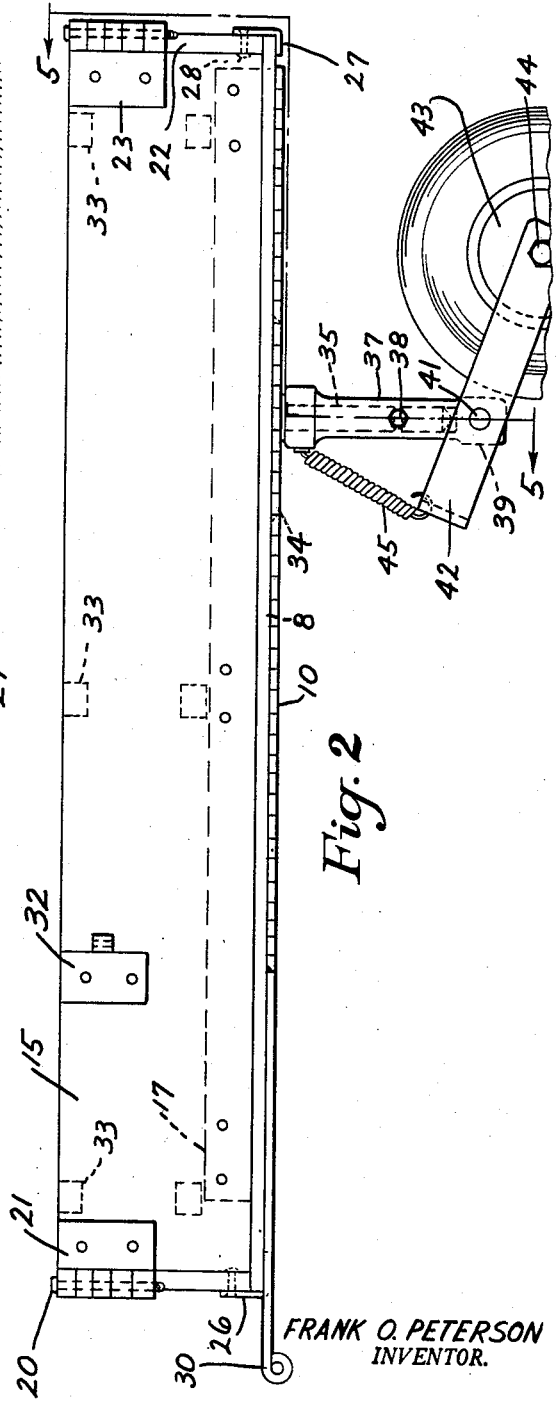
FRANK O. PETERSON
INVENTOR.
BY Edward M. Apple
ATTORNEY June 26, 1951 F. O. PETERSON 2,558,153
ONE WHEEL COLLAPSIBLE TRAILER
Filed April 7, 1948 3 Sheets-Sheet 3
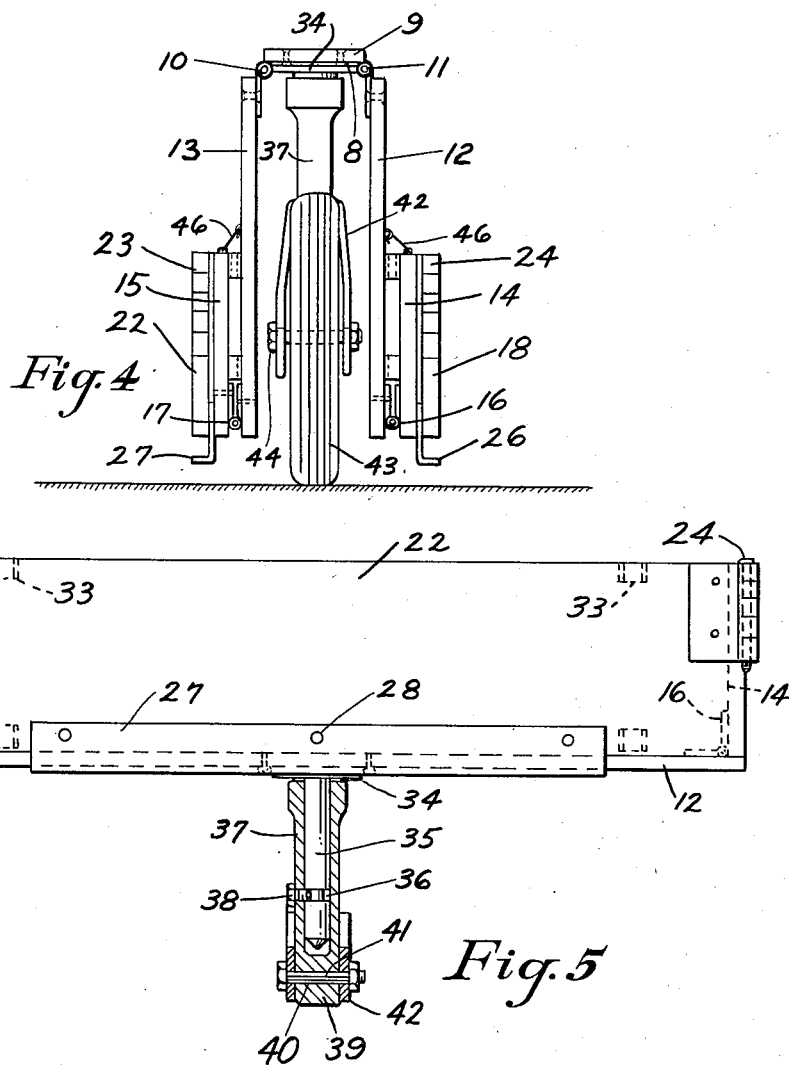
INVENTOR.
FRANK O. PETERSON
BY Edward M. Apple
ATTORNEY Patented June 26, 1951

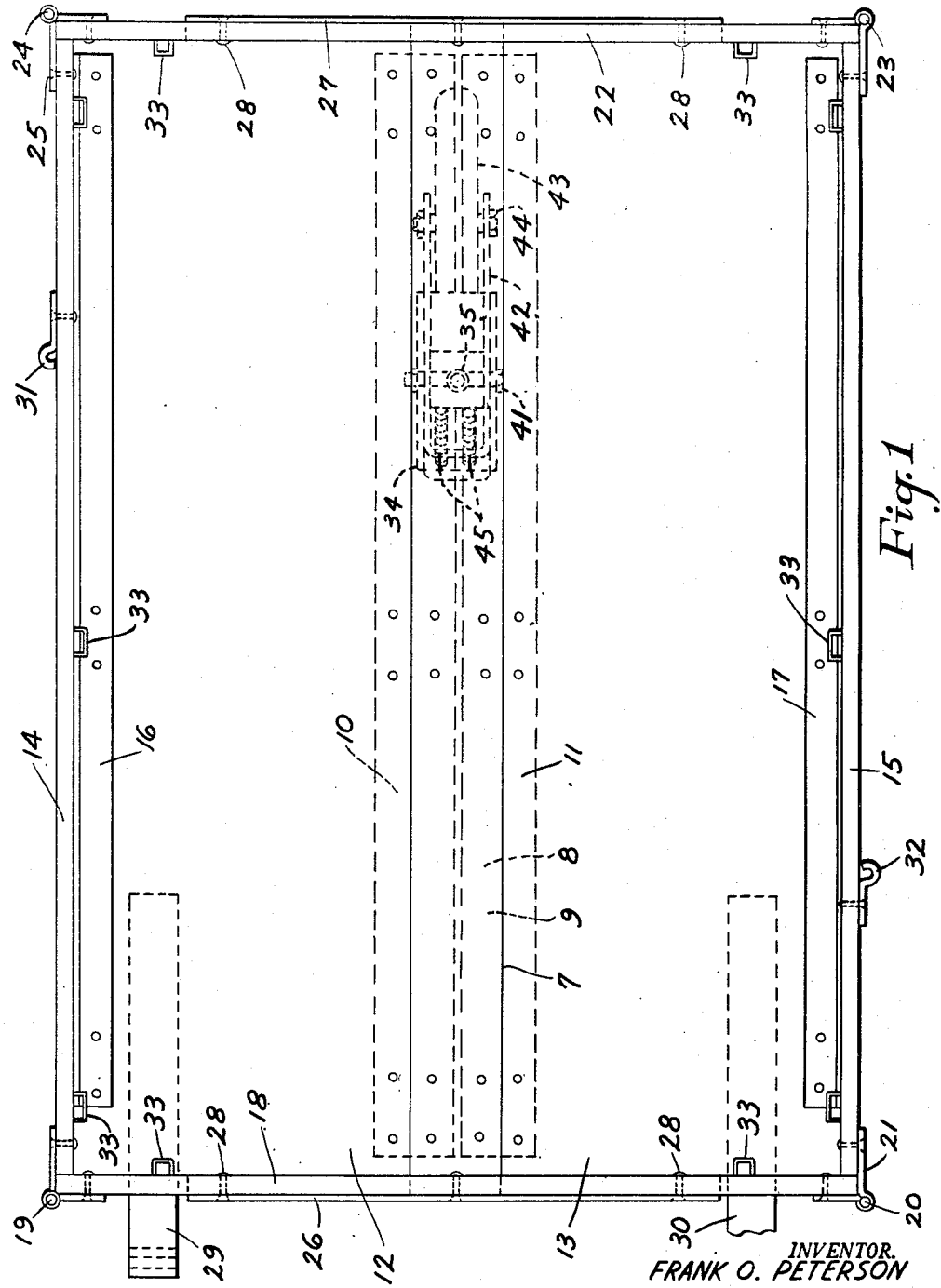

2,558,153

UNITED STATES PATENT OFFICE 2,558,153

ONE WHEEL COLLAPSIBLE TRAILER

Frank O. Peterson, West Los Angeles, Calif.

Application April 7, 1948, Serial No. 19,613

2 Claims. (Cl. 296—27)

This invention relates to automobile trailers, and has particular reference to a one-wheel trailer which may be collapsed for storage in a minimum of space.

An object of the invention is to provide a one-wheel trailer which is constructed and arranged so that the trailer bed, sides, and end gate may be folded into positions alongside of the wheel whereby the device may be stored in a comparatively narrow space.

Another object of the invention is the provision of a collapsible trailer which is constructed and arranged so that when extended for use it is rigidly reinforced so that it may withstand comparatively hard usage, and carry a comparatively heavy load.

Another object of the invention is the provision of a device of the character indicated which is constructed and arranged with a centrally positioned member, which serves as the main support for the device.

Another object of the invention is the provision of a collapsible trailer which has a centrally positioned strong back member, which is arranged to cooperate with the end gates of the trailer to effect a rigid boxlike assembly when in use.

Another object of the invention is the provision of a collapsible trailer which has a single wheel, and novel means for supporting the wheel.

The foregoing and other objects and advantages of the invention will become more apparent as the description proceeds, reference being made from time to time to the accompanying drawings, forming part of the within disclosure, in which drawings:

Fig. 1 is a top plan view of a one-wheel trailer embodying the invention shown in its assembled condition ready for use.

Fig. 2 is a side elevational view of the device shown in Fig. 1.

Fig. 3 is a side elevational view of the device in collapsed condition ready for storage.

Fig. 4 is an end view of the device in collapsed position as shown in Fig. 3.

Fig. 5 is an end view, partly in section, taken substantially on the line 5—5 of Fig. 2.

Referring now more particularly to the drawings, it will be understood that in the embodiment herein disclosed, the reference character 7 indicates a centrally positioned longitudinal member which serves as a strong back for the assembly. The member 7 is preferably formed of a heavy metal plate 8 (Fig. 4) and a superimposed wooden member 9 when the device is to be constructed mainly of wood. It is within the contemplation of the invention, however, to form the body of the trailer of metal stampings, whereupon the metal plate 8 could be used without the member 9. Longitudinally hinged, as at 10 and 11, to the member 9 are bed plates 12 and 13, which together with the member 9 constitute the bed of the trailer when the device is in assembled position and ready for use, as shown in Fig. 1.

Side gates 14 and 15 are longitudinally hinged, as at 16 and 17, to the bed plates 12 and 13. A front end gate 18 is hinged at one end, as at 19, to one end of the side gate 14, and is secured at the other end by means of a removable pin 20 and hinge members 21 to the side gate 15. The rear end gate 22 is hinged, as at 23, to the opposite end of the side gate 15, and is provided with a removable pin 24 and hinge members 25 which secure it, at the opposite end, to the side gate 14. Both of the end gates 18 and 22 are provided with angle plate members 26 and 27, which are permanently secured to the end gates 18 and 22 by rivets 28, or other suitable means.

The horizontal legs of the angle plates 26 and 27 (Figs. 1 and 2) are arranged to extend under the ends of the metal plate member 8 and the bed plates 12 and 13 so that when the device is assembled, as shown in Fig. 1, there is a cooperating interlocking of the parts to effect a rigid assembly when the device is in operation. Draw bars 29 and 30 are secured to the underside of the bed plates 12 and 13 so that the trailer may be attached to an automobile or other towing vehicle. Two draw bars are required in order to effect the movement of the caster like wheel.

The side gate 14 is provided with a member 31 which in this embodiment is one-half of a hinge, so that when the device is to be collapsed, the front end gate 18 may be swung on the hinge 19 to a position parallel with the side gate 14 and made fast by the removable pin 20. The side gate 15 is provided with a corresponding member 32 which is adapted to accommodate one-half of the hinge member 25 and the removable pin 24 when the end gate member 22 is swung into parallel position with the side gate 15 as shown in Figs. 3 and 4.

The side gates 14 and 15 and the end gates 18 and 22 may be provided with loops 33 adapted to accommodate stakes, whereby the height of the gates may be increased and means may be provided for supporting a covering for the trailer body.

Secured to the underside of the metal plate 8 (Figs. 2 and 5) is an abutment member 34 to which is secured a spindle 35, the latter having a peripheral groove 36. The spindle 35 is adapted to accommodate a cylindrical member 37, which is arranged for rotation on the spindle 35, and which is held against vertical displacement by means of set screw 38, which is adapted to engage the peripheral groove 36 formed in the spindle.

The cylindrical member 37 has a squared end 39 which is provided with a horizontal bore 40, which is adapted to accommodate a hardened bolt 41 which serves as a pivot for a U-shaped member 42, the legs of which are drilled to accommodate the bolt 41. The rubber tired wheel 43 is mounted at the open end of the U-shaped member 42 by means of a spindle 44.

A spring 45 is secured at one end to the closed end of the U-shaped member 42, and is secured at the other end to the cylindrical member 37 so that the member 42 is spring tensioned at all times when the device is in use.

When it is desired to collapse the trailer, the end gate 18 is swung on the hinge 19 into a position parallel with the side gate 14 and made fast as previously described. The end gate 22 is swung on the hinge 23 into a position parallel to the side gate 15, and made fast as previously described.

When the end gates are swung into such position, the lateral supports for the bed plates 12 and 13 are thereby removed, and the bed plates 12 and 13 fall of their own weight into vertical positions alongside of the wheel 43 as shown in Fig. 4. At the same time the side gates 14 and 15 assume parallel positions alongside the bed plates 12 and 13, as shown in Fig. 4. The side gates 14 and 15 may be secured to the bed plates 12 and 13 by any suitable means such as by screen door hooks and eyes 46 (Fig. 4), or other suitable means, when the device is in collapsed condition as shown in Fig. 4.

Having described my invention, what I claim and desire to secure by Letters Patent is:

1. A collapsible trailer comprising a centrally disposed longitudinal strong back member, a caster assembly secured to the underside of said member, bed plates hinged to said member, a side gate hinged to each of said bed plates, a front end gate pivoted to one of said side gates, and a rear end gate pivoted to the other said side gate, there being means carried by said end gates for locking said hinged members into a rigid assembly, said last named means including angular bars having horizontal legs, the said horizontal legs being positioned beneath the ends of said strong back member and said bed plates.

2. A collapsible trailer comprising the combination of a longitudinal strong back member, a wheel pivoted to the underside of said strong back member, a bed plate hinged to each side of said strong back member, a side gate hinged to each of said bed plates, an end gate pivoted to each of said side gates, means on said side gates arranged to cooperate with means on said end gates to secure the latter in closely parallel relation with said side gates when the device is collapsed, and angular bars having vertical legs secured to said end gates, said bars having horizontal legs arranged to extend under said strong back member and said bed plates to hold the device in rigid non-collapsed position.

FRANK O. PETERSON.

REFERENCES CITED

The following references are of record in the file of this patent:

UNITED STATES PATENTS

| Number | Name | Date |
|---|---|---|
| 908,472 | Lyons | Jan. 5, 1909 |
| 1,471,479 | Gleissner | Oct. 23, 1923 |
| 1,649,946 | Brostedt | Nov. 22, 1927 |
| 1,739,716 | Fisher | Dec. 17, 1929 |
| 1,823,816 | Chittenden | Sept. 15, 1931 |
| 1,828,684 | Scarlett | Oct. 20, 1931 |
| 1,857,758 | Kuester | May 10, 1932 |
| 1,982,935 | Staugaard | Dec. 4, 1934 |
| 2,174,465 | Jedlicka | Sept. 26, 1939 |
| 2,189,204 | Goin | Feb. 6, 1940 |